(12) United States Patent
Blaz et al.

(10) Patent No.: US 12,081,072 B2
(45) Date of Patent: Sep. 3, 2024

(54) ELECTRONICALLY COMMUTATED MOTOR, FAN WITH ELECTRONICALLY COMMUTATED MOTOR, AND HOUSEHOLD APPLIANCE

(71) Applicant: BSH Hausgeraete GmbH, Munich (DE)

(72) Inventors: Robert Blaz, Humenne (SK); Viliam Farkas, Michalovce (SK); Martin Kuco, Michalovce (SK)

(73) Assignee: BSH Hausgeraete GmbH, Munich (DE)

( * ) Notice: Subject to any disclaimer, the term of this patent is extended or adjusted under 35 U.S.C. 154(b) by 199 days.

(21) Appl. No.: 17/580,073

(22) Filed: Jan. 20, 2022

(65) Prior Publication Data
US 2022/0247245 A1    Aug. 4, 2022

(30) Foreign Application Priority Data

Feb. 1, 2021 (EP) ..................................... 21154545

(51) Int. Cl.
| | |
|---|---|
| H02K 1/18 | (2006.01) |
| F04D 25/06 | (2006.01) |
| F04D 29/056 | (2006.01) |
| H02K 7/08 | (2006.01) |
| H02K 21/22 | (2006.01) |

(52) U.S. Cl.
CPC ............. *H02K 1/187* (2013.01); *F04D 25/06* (2013.01); *F04D 25/0613* (2013.01); *F04D 29/056* (2013.01); *H02K 7/088* (2013.01); *H02K 21/22* (2013.01)

(58) Field of Classification Search
CPC .... F04D 25/06; F04D 25/0613; F04D 29/056; F04D 25/062; F04D 25/064; F04D 25/08; F04D 29/0563; F04D 29/059; F04D 29/263; H02K 1/187; H02K 7/088; H02K 21/22; H02K 5/1737; H02K 7/086; H02K 7/14
See application file for complete search history.

(56) References Cited

U.S. PATENT DOCUMENTS

| | | | |
|---|---|---|---|
| 9,109,610 B2 | 8/2015 | Streng et al. | |
| 2007/0014675 A1* | 1/2007 | Nagamatsu | ......... F04D 25/0613 417/354 |
| 2007/0075597 A1* | 4/2007 | Seidler | .................. F04D 19/002 310/90 |

(Continued)

FOREIGN PATENT DOCUMENTS

| | | | | |
|---|---|---|---|---|
| DE | 102018202943 A1 * | 8/2019 | ........... | H02K 1/2733 |
| EP | 2236838 A1 | 10/2010 | | |
| WO | 2019166333 A1 | 9/2019 | | |

*Primary Examiner* — Bryan M Lettman
(74) *Attorney, Agent, or Firm* — Laurence A. Greenberg; Werner H. Stemer; Ralph E. Locher

(57) ABSTRACT

An EC motor contains a rotor, a stator, a shaft, a bearing system and an intermediate element connecting the stator to the shaft. The rotor includes a rotor case and one or more permanent magnets, and it is supported, by the bearing system, so as to be rotatable about the shaft. The stator is at least partially arranged, by the intermediate element, in a radially outer circumference of the bearing system. Ideally, a fan contains such an EC motor and a fan wheel connected to the rotor case of the rotor of the EC motor. Moreover, a household appliance contains an EC motor or a fan including the EC motor.

12 Claims, 3 Drawing Sheets

(56) References Cited

U.S. PATENT DOCUMENTS

| | | | |
|---|---|---|---|
| 2015/0322963 A1* | 11/2015 | Honda | F04D 17/08 |
| | | | 415/200 |
| 2017/0321706 A1* | 11/2017 | Roessler | F04D 29/646 |
| 2018/0235103 A1* | 8/2018 | Yeh | F04D 25/064 |
| 2019/0093662 A1* | 3/2019 | Inouchi | F04D 29/329 |
| 2019/0093667 A1* | 3/2019 | Inouchi | F04D 29/263 |
| 2020/0403469 A1* | 12/2020 | Zhang | B29C 45/17 |

* cited by examiner

Fig. 1A
Fig. 1B
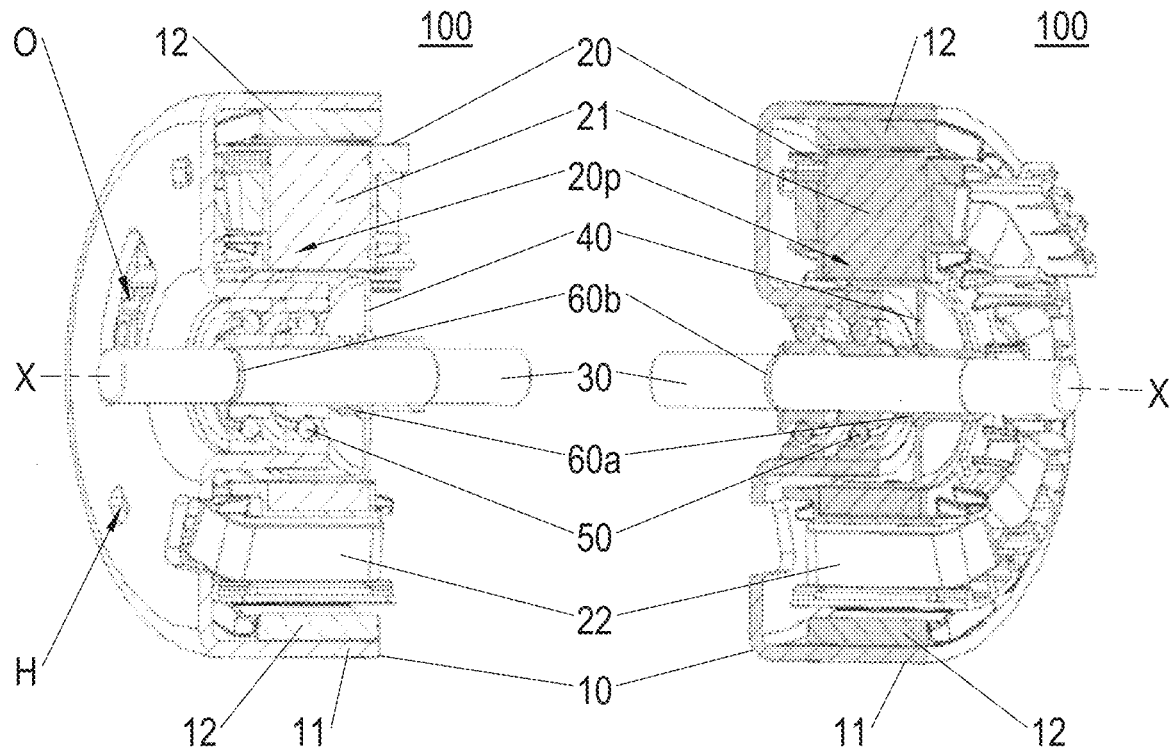
Fig. 1C
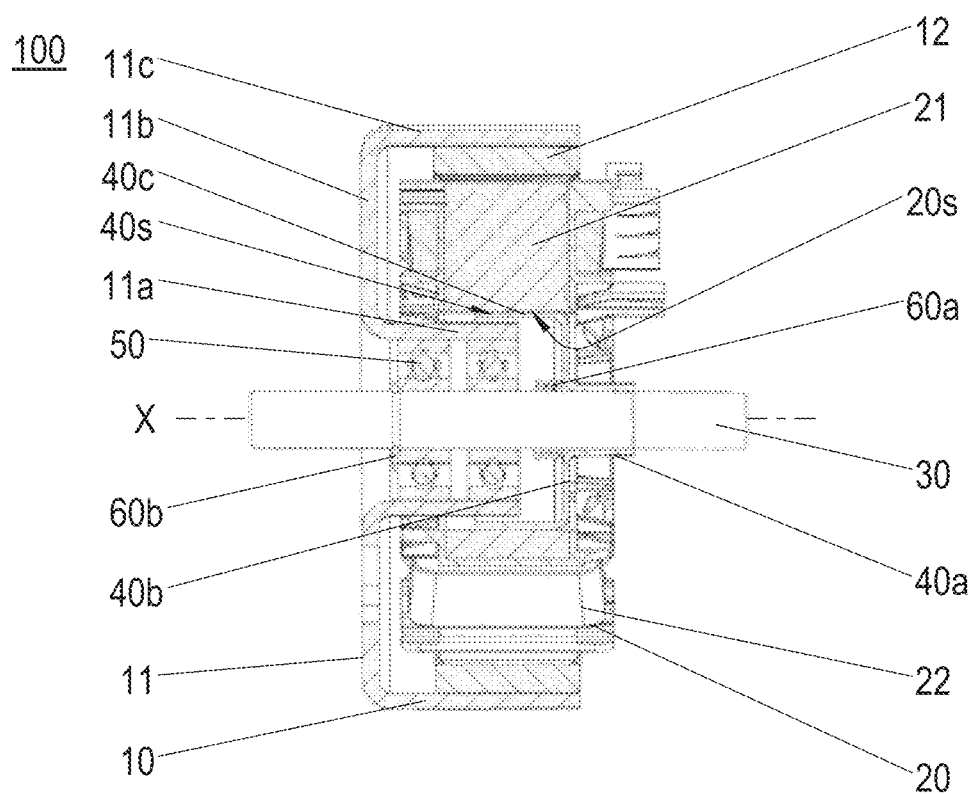

ELECTRONICALLY COMMUTATED MOTOR, FAN WITH ELECTRONICALLY COMMUTATED MOTOR, AND HOUSEHOLD APPLIANCE

CROSS-REFERENCE TO RELATED APPLICATION

This application claims the priority, under 35 U.S.C. § 119, of European Patent Application EP21154545.4, filed Feb. 1, 2021; the prior application is herewith incorporated by reference in its entirety.

FIELD AND BACKGROUND OF THE INVENTION

The present invention concerns an EC motor and a fan containing an EC motor. The invention further concerns a household appliance containing an EC motor or even a fan with an EC motor.

Electronically commutated motors (briefly: "EC motors") are synchronous direct current electric motors typically containing a rotor and a stator. The rotor includes permanent magnets configured to rotate about coils comprised by the stator.

Such EC motors are used in various applications. In particular, EC motors may be included in pumps or in fans of ventilation systems.

International patent disclosure WO 2019/166333 A1, corresponding to U.S. patent publication No. 2020/0403469, teaches a brushless electric motor, whose rotor has a permanent magnet magnetized in the manner of a Halbach arrangement, wherein the rotor magnet is an injection-moulded part containing embedded magnetically anisotropic magnet material.

From published, European patent application EP 2 236 838 A1, corresponding to U.S. Pat. No. 9,109,610, a radial fan containing an electronically commutated direct current motor is known, whose stator sits rotationally fixed on a support part embodied as an elongated bearing axle, wherein the rotor is formed from a ground ring and rotatably supported on the support part.

SUMMARY OF THE INVENTION

It is an object of the present invention to provide an alternative EC motor, which may be manufactured so as to be particularly compact. It is a further object to provide an improved fan and an improved household appliance.

The object is solved by an EC motor according to the independent EC motor claim, by a fan according to the independent fan claim and by a household appliance according to the independent household appliance claim. Advantageous embodiments are disclosed in the dependent claims, the description and the figures.

An EC motor according to the present invention contains a rotor, a bearing system, a stator, a shaft and an intermediate element connecting the stator to the shaft. The rotor includes a rotor case and one or more permanent magnets fixed to the rotor case, and it is supported, by the bearing system, so as to be rotatable about the shaft. The stator is at least partially arranged, by means of the intermediate element, in a radially outer circumference of the bearing system.

As is to be noted, unless otherwise specified, the term "radial" as well as the expressions "axial" and "circumference direction" (and their respective linguistic derivations) in this document always relate to a designated axis of rotation of the rotor.

The bearing system supporting the rotor case thus is at least partially encompassed by the stator (which preferably contains one or more stator stack(s) and magnet wires (coils)). The intermediate element, which is a separate constructional component of the EC motor, serves to connect the stator to the shaft, in a manner leaving space for at least a portion of the bearing system. Such construction allows a particularly space-saving, compact assembly of the EC motor. In particular, a radially innermost portion of the rotor case may extend into an interior space surrounded by the stator.

Preferably, the one or more permanent magnets of the rotor is/are arranged in a radial circumference (i.e., radially outside) of the stator. That is, the one or more permanent magnets of the rotor are advantageously configured to spin about at least a portion of the stator.

Considered in radial direction, at least a portion of the stator (in particular, of one or more coils comprised by the stator) is preferably arranged between (at least a portion of) the bearing system and the one or more permanent magnet(s).

In particular, the EC motor may preferably be configured as an outrunner.

The intermediate element of an EC motor according to the present invention may advantageously serve as a barrier for vibrations, in particular for vibrations originating from the stator (in particular from a stator stack thereof), thus inhibiting or at least damping the vibration's propagation to the motor shaft and possibly one or more further connected components. The intermediate element may thus serve as a buffer for such vibrations.

Preferably, the intermediate element separates the stator and the shaft, such that these elements thus have no direct contact. In particular, the intermediate element may be of a different material than the shaft. For instance, the intermediate element may at least partially be made of a resilient material, in particular of a plastic material.

Additionally or alternatively, a connection of the intermediate element with the shaft may preferably be configured to absorb vibrations. For example, the connection is resilient in a designated direction of rotation of the rotor (i.e., in circumference direction). Such resilience of the connection of the intermediate element with the shaft may preferably be larger in circumference direction than in axial direction. In particular, a stiffness of the intermediate element connected to the shaft is advantageously smaller in direction normal to the rotation than in axial direction.

The intermediate element may comprise a (preferably cylindrical) sleeve portion the shaft may penetrate and which may abut on the shaft.

According to advantageous embodiments, the intermediate element contains a portion extending between the stator and the rotor case (when considered in radial direction). Thereby, a particularly solid fixation of the stator and nevertheless a compact assembly of the EC motor can be achieved.

Preferably, the intermediate element is fixed to a stator surface which faces the shaft. In particular, the intermediate element may preferably be fixed to an inner diameter of at least one stator stack of the stator. Such embodiments provide for a particularly advantageous radial fixation of the stator ensuring a stable distance of the stator and the bearing system supporting the rotor and being at least partially encompassed (surrounded) by the stator.

According to advantageous embodiments of the present invention, the intermediate element is at least partially built as a plastic overmoulding. In particular, such intermediate element may provide an insulation between one or more coil(s) and at least one stator stack of the stator.

The rotor case of the EC motor according to an embodiment of the present invention may advantageously at least partially be made of metal; in particular, it may comprise a deep drawn metal part. Such rotor case may fulfil various functions, as it provides for a particularly advantageous conduction of magnetic flux, facilitates an advantageous connection to a fan wheel, bears the one or more permanent magnet(s), and bears the bearing system, thus insuring rotation about the shaft.

The deep drawn metal part advantageously makes a ground ring of the rotor dispensable; accordingly, the EC motor according to preferred embodiments is devoid of a ground ring.

Preferably, the motor case is a monolithic component.

The rotor case may comprise a cylindrical portion (whose centre axis may preferably coincide with the centre axis of the shaft) surrounding at least a part of the stator. In particular, the rotor case may preferably be shaped as a ring component, wherein at least a portion of such ring component may preferably have U-shaped cross sections in axial direction.

In such embodiments, the permanent magnet(s) may preferably be fixed to a radially inner surface of the cylindrical portion. Thereby, a particularly close proximity of the rotated permanent magnets and the stator can be achieved.

The at least one permanent magnet is preferably an anisotropic ferrite magnet. In particular, the rotor may comprise a plurality of permanent segment magnets. Some or all of these segment magnets may anisotropic segment ferrite magnets.

A radially innermost portion of the rotor case (such as radially inner support portion rotatably held by the bearing system) may extend into an interior space surrounded by (at least a portion of) the stator.

According to preferred embodiments of the present invention, the EC motor is a multi-phase EC motor, in particular a three-phase EC motor.

Preferably, the EC motor is devised for a household appliance. It may be configured to drive a fan. In particular, the rotor case may be configured to be connected to a fan wheel.

The household appliance may be constructed for cooling or drying purposes in a respective environment, or to extract gas (which may include fume, steam and/or airborne grease, for example). The fan may be included in a device such as a computer, a consumer electronics, a refrigerator, a kitchen hood or a vacuum cleaner, for instance.

A fan according to the present invention contains an EC motor according to an embodiment of the present invention, and a fan wheel connected to the rotor case of the EC motor.

The fan wheel may comprise an overmoulding of at least a portion of the rotor case (comprised by the rotor of the EC motor). In such case, at least one hole and/or recess may preferably be included in the rotor case, and the fan wheel may comprise at least one bulge overlapping (and preferably engaging with) the at least one hole/recess. Thereby, a form fit connection of the fan wheel and the rotor case may be implemented, by means of the which form fit connection a transfer of torque from the EC motor to the fan wheel may be realized. Additionally or alternatively, such transfer of torque may be realized by a friction connection of the overmoulding and the rotor case. Preferably, the overmoulding is at least partially made of plastic.

Additionally or alternatively, the fan wheel may comprise a metal sheet, which may be connected to the rotor case by means of a press fit connection. In particular, in such embodiments, the fan wheel may be a metal sheet fan wheel.

A household appliance according to the present invention comprises an EC motor according to an embodiment of the present invention. In particular, the household appliance may comprise a fan according to an embodiment of the present invention. The household appliance may be a computer, a consumer electronics, a refrigerator, a kitchen hood or a vacuum cleaner, for instance.

In the following, preferred embodiments of the present invention are explained with respect to the accompanying drawings. As is to be understood, the various elements and components are depicted as examples only, may be facultative and/or combined in a manner different than that depicted. Reference signs for related elements are used comprehensively and not defined again for each figure.

Other features which are considered as characteristic for the invention are set forth in the appended claims.

Although the invention is illustrated and described herein as embodied in an EC motor, fan with an EC motor, and a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 1A an 1B are perspective views an exemplary embodiment of an EC motor according to the present invention;

FIG. 1C is a sectional view showing the exemplary embodiment of the EC motor according to the present invention;

DETAILED DESCRIPTION OF THE INVENTION

Figure 2:
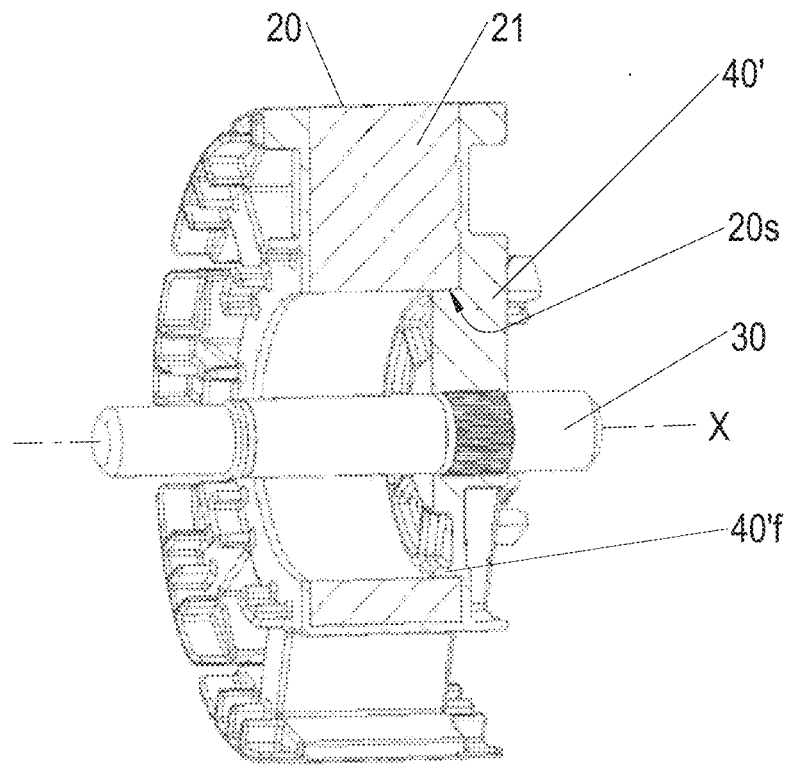
FIG. 2 is a perspective view showing a portion of the EC motor according to an alternative embodiment of the present invention.

Referring now to the figures of the drawings in detail and first, particularly to FIGS. 1A-1C thereof, there are shown respective sections of an exemplary EC motor 100 according to an embodiment of the present invention. Namely, FIGS. 1A and 1B each provide a perspective view of the EC motor 100 cut open, and FIG. 1C is a cross section along the designated axis of rotation X of the rotor 10.

The EC motor 100 comprises a rotor 10, a stator 20, a shaft 30, an intermediate element 40 and a bearing system 50. The rotor 10 contains a rotor case 11 holding a plurality of permanent magnets (segments) 12. The bearing system 50, which in the exemplary embodiment depicted contains a ball bearing, supports the rotor case 11 so as to be rotatable about the shaft 30 and, thereby, to a longitudinal centre axis X thereof. Thereby, the permanent magnets 12 fixed to the rotor case 11 are rotatable about the shaft 30 and about the stator 20 contains stator stack 21 and coils 22, the stator 20 being connected to the shaft by the intermediate element 40. A portion 20p of the stator 20 is arranged in a radially outer circumference of the bearing system 50, and—considered in radial direction—between the bearing system 50 and the permanent magnets 12.

A retaining system containing a rising spring 60a and a holding ring 60b arranged at opposite sides (in axial direction) of the bearing system 50 serves to secure an appropriate axial preload.

As indicated in FIG. 1C, the intermediate element 40 contains a sleeve portion 40a the shaft 30 penetrates. The sleeve portion 40a abuts on the shaft 30. Preferably, a connection of the sleeve portion 40a with the shaft 30 is configured to absorb vibrations originating, when the EC motor 100 is in operation, from the stator 20. For instance, the connection may be resilient in rotation direction.

The sleeve portion 40a protrudes in axial direction from a spacer portion 40b of the intermediate element 40, which spacer portion 40b extends in radial direction. In the exemplary embodiment depicted in FIGS. 1A-1C, the spacer portion 40b is formed as a ring-shaped slice; according to alternative (not shown) embodiments it may (additionally or alternatively to a slice) comprise one or more spoke element/s. At a radially outer circumference, the spacer portion 40b passes into a connector portion 40c connected to a stator surface 20s facing the shaft 30.

In the exemplary embodiment shown, the connector portion 40c has a cylindrical shape, whose center axis coincides with a center axis X of the shaft 30 (and thus with the designated axis of rotation of the rotor 10). A surrounding section 40s of the connector portion 40c surrounds a part of the bearing system 50 supporting the rotor case 11 of the rotor 10. In the embodiment shown, the surrounding section 40s extends (radially) between the stator 20 and the rotor case 11.

As further indicated in FIG. 1C, the rotor case 11 of the exemplarily depicted embodiment of the present invention has (essentially) U-shaped cross sections in axial direction. It comprises a radially inner support portion 11a rotatably supported by the bearing system 50. The support portion 11a includes a cylindrical region whose center axis coincides with the center axis X of the shaft 30. Radially outside of the support portion 11a, the rotor case 11 comprises a magnet holder portion 11c holding (on a surface facing the shaft 30) the permanent magnets 12. In the present case, the magnet holder portion 11c has a cylindrical shape with its center axis coinciding with the centre axis X of the shaft 30. In particular, the support portion 11a and the magnet holder portion 11c are coaxial.

At its end facing away (in axial direction) from the intermediate element 40, the rotor case 11 is delimited by a face portion 11b. The face portion extends in radial direction, in the case shown along a plane which is orthogonal to the shaft 30 (i.e., it extends only in radial direction). In the embodiment depicted, the face portion 11b is formed as a slice; according to alternative (not shown) embodiments it may (additionally or alternatively to a slice) comprise one or more spoke component/s.

As can be seen in FIG. 1A, the face portion 11b includes openings O which may serve for cooling the coils 22 of the stator. Moreover, the face portion 11b of the embodiment depicted comprises a plurality of holes H serving as overmoulding openings for connection with a fan wheel (see FIG. 4A, where the holes are covered by bulges 210).

FIG. 2 provides an insight in components of an alternative EC motor according to the present invention is. In this case, the intermediate element 40' is implemented as an overmoulding part, which preferably is at least partially made of plastics.

In this embodiment, the stator 20 is connected to the intermediate element 40' both in axial direction and in radial direction. In particular, the intermediate element 40' contains a flange portion 40'f connected to a stator surface 20s facing the shaft 30.

Figure 3:
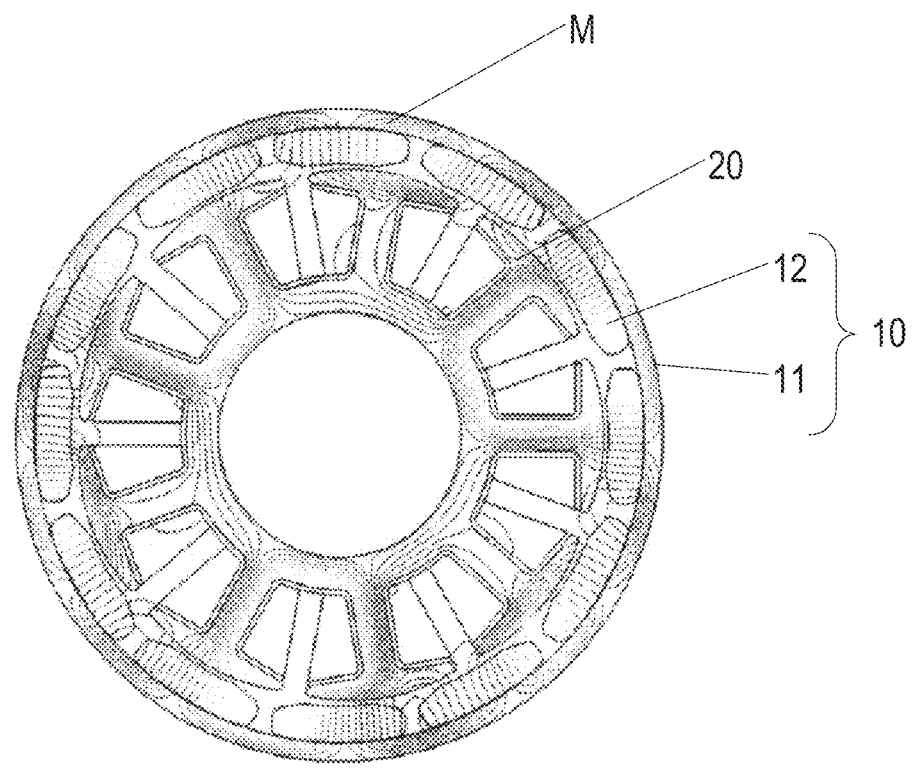
FIG. 3 is a sectional view showing magnetic flux in an exemplary embodiment of the EC motor according to the present invention.

FIG. 3 illustrates, with axial viewing direction, a magnetic flux M occurring in a rotor 10 and a stator 20 of an electric EC motor according to the present invention.

Figure 4A:
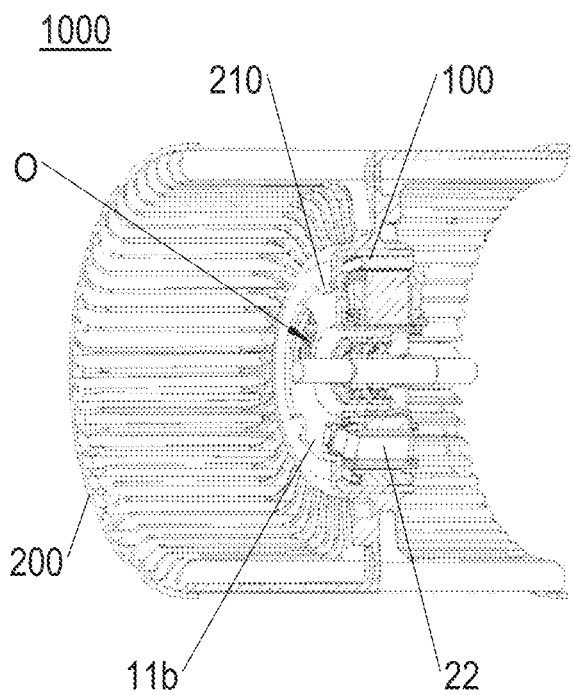
FIG. 4A is a perspective view showing an exemplary embodiment of a fan according to the present invention.
Figure 4B:
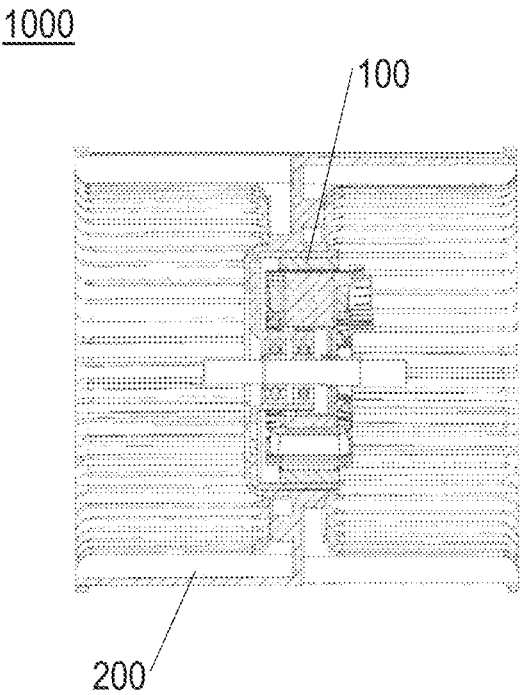
FIG. 4B is a front view of the exemplary embodiment of the fan according to the present invention.

By FIGS. 4A and 4B different insights in a fan 1000 according to an embodiment of the present invention are given. The fan 1000 contains the EC motor 100 in accordance with the embodiment shown in FIGS. 1A-1 of the present invention.

Moreover, the fan 1000 comprises a fan wheel 200, which is connected to the rotor case 11 at the face portion 11b thereof by means of an overmoulding (preferably at least partially of plastic material). Therein, bulges 210 of the fan wheel 200 overlap and engage (not visible) with the holes H (indicated in FIG. 1A) of the face portion 11b. Thereby, a transfer of torque from the EC motor 100 to the fan wheel 200 can be realized. Additionally, a friction connection of the overmoulding and the rotor case 11 may facilitate the torque transfer.

As is further seen in FIG. 4A, openings O in the face portion 11b of the rotor case are kept free from the overmoulding. As a consequence, these openings serve as air passages for cooling the coils 22 of the stator.

Figure 5A:
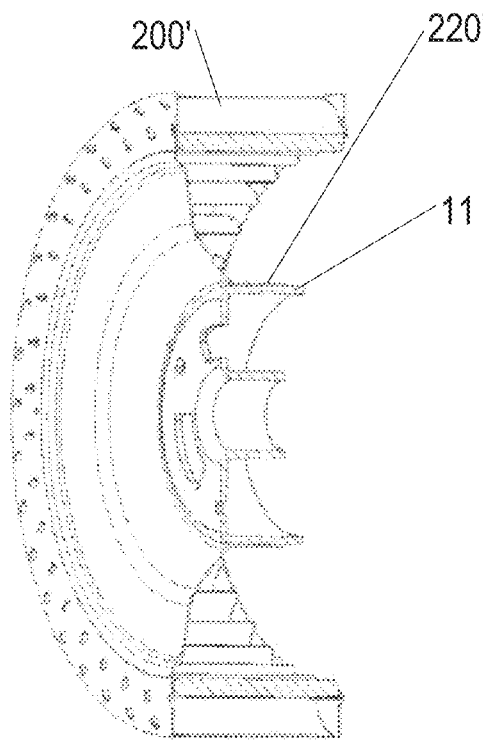
FIGS. 5A and 5B are sectional views being different views of a rotor case-fan wheel—combination of an exemplary fan according to the present invention.
Figure 5B:
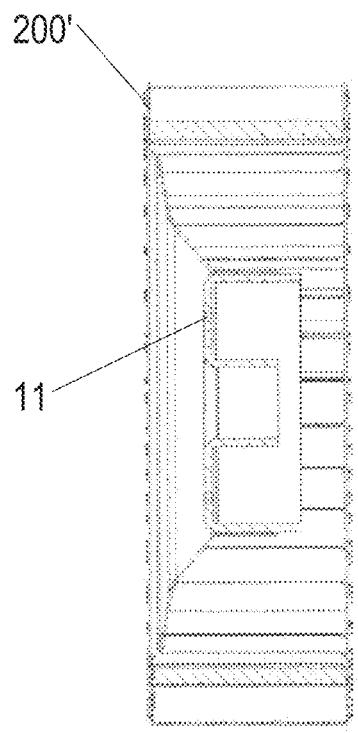

FIGS. 5A and 5B provide insights in components of a fan according to an alternative embodiment of the present invention. Therein, the fan wheel 200' comprises a metal sheet connected to the rotor case 11, at a flange portion 220' of the fan wheel 200', by a press fit connection.

Disclosed is an EC motor 100 comprising a rotor 10, a stator 20, a shaft 30, a bearing system 50 and an intermediate element 40, 40' connecting the stator 20 to the shaft 30. The rotor 10 includes a rotor case 11 and one or more permanent magnets 12, and it is supported, by the bearing system 50, so as to be rotatable about the shaft 30. The stator 20 is at least partially arranged, by means of the intermediate element 40, 40', in a radially outer circumference of the bearing system 50.

Further disclosed is a fan 1000 comprising such EC motor 100 and a fan wheel 200, 200' connected to the rotor case 11 of the rotor 10 of the EC motor 100.

Moreover, a household appliance comprising an EC motor 100 or even a fan 1000 including an EC motor 100 is disclosed.

The following is a summary list of reference numerals and the corresponding structure used in the above description of the invention:

10 rotor
11 rotor case
11a support portion 11b face portion
11c magnet holder portion
12 permanent magnet
20 stator
20p stator portion arranged in a radially outer circumference of the bearing system 50
20s stator surface facing the shaft
21 stator stack
22 coil
30 shaft
40, 40' intermediate element
40a sleeve portion
40b spacer portion
40c connector portion
40'f flange portion
40s surrounding section
50 bearing system
60a spring
60b holding ring
100 EC motor
200, 200' fan wheel
210 bulge
220' flange portion
1000 fan
H hole
M magnetic flux
O opening
X designated axis of rotation/longitudinal centre axis of the shaft 30

The invention claimed is:

1. An electronically commutated (EC) motor, comprising:
a rotor having a rotor case and at least one permanent magnet being fixed to said rotor case;
a stator;
a shaft;
a bearing assembly supporting said rotor case about said shaft; and
an intermediate connector connecting said stator to said shaft so as to be at least partially disposed in a radially outer circumference of said bearing assembly, the intermediate connector separating said stator and said shaft with no direct contact between said stator and said shaft, said intermediate connector being a different material than said shaft, said intermediate connector being made of a resilient plastic material, a connection of said intermediate element with said shaft being configured for absorbing vibrations, said connection being resilient in a designated direction of rotation of said rotor, a resilience of said connection of the intermediate connector with said shaft being larger in a circumferential direction than in an axial direction of said shaft with a stiffness of said intermediate connector being smaller in a direction normal to the direction of rotation than in the axial direction.

2. The EC motor according to claim 1, wherein said intermediate connector contains a portion extending between said stator and said rotor case.

3. The EC motor according to claim 2, wherein said intermediate connector is fixed to a stator surface of said stator which faces said shaft.

4. The EC motor according to claim 1, wherein said intermediate connector is at least partially built as a plastic overmoulding.

5. The EC motor according to claim 1, wherein said rotor case is at least partially made of a deep drawn metal part.

6. The EC motor according to claim 1, wherein said at least one permanent magnet contains at least one anisotropic ferrite magnet.

7. A fan, comprising:
said EC motor according to claim 1; and
a fan wheel connected to said rotor case of said EC motor.

8. The fan according to claim 7, wherein said fan wheel contains an overmoulding of at least a portion of said rotor case.

9. The fan according to claim 7, wherein said fan wheel contains a metal sheet connected to said rotor case by a press fit connection.

10. A household appliance, comprising:
said EC motor according to claim 1; or
said fan according to claim 7.

11. The EC motor according to claim 1, wherein said intermediate connector is disposed directly on said shaft.

12. The EC motor according to claim 1, wherein said intermediate connector has a sleeve portion, said shaft passes through said sleeve portion.

* * * * *